United States Patent
Laine et al.

(10) Patent No.: US 9,561,966 B2
(45) Date of Patent: Feb. 7, 2017

(54) GLYCOXY SILANES AS A SOURCE OF SILICA AND SILICATE PRECIPITATES

(71) Applicants: Wadham Energy LP, San Ramon, CA (US); Mayaterials, Inc., Ann Arbor, MI (US)

(72) Inventors: Richard M. Laine, Ann Arbor, MI (US); Julien C. Marchal, Ann Arbor, MI (US); Vera Popova, Ann Arbor, MI (US); David J. Krug, Ann Arbor, MI (US)

(73) Assignee: WADHAM ENERGY LP, Ann Arbor, MI (US)

( * ) Notice: Subject to any disclaimer, the term of this patent is extended or adjusted under 35 U.S.C. 154(b) by 818 days.

(21) Appl. No.: 13/744,326

(22) Filed: Jan. 17, 2013

(65) Prior Publication Data

US 2013/0183232 A1   Jul. 18, 2013

Related U.S. Application Data

(60) Provisional application No. 61/587,188, filed on Jan. 17, 2012, provisional application No. 61/587,501, filed on Jan. 17, 2012.

(51) Int. Cl.
*C01B 33/00* (2006.01)
*C01B 39/02* (2006.01)
*C01B 33/187* (2006.01)
*C01B 33/18* (2006.01)

(52) U.S. Cl.
CPC .............. *C01B 39/02* (2013.01); *C01B 33/18* (2013.01); *C01B 33/187* (2013.01)

(58) Field of Classification Search
CPC ........ C01B 33/00; C01B 33/18; C01B 33/187; C01B 33/10789; C01B 39/02
See application file for complete search history.

(56) References Cited

U.S. PATENT DOCUMENTS

| | | | |
|---|---|---|---|
| 5,445,804 A * | 8/1995 | Iosef | 423/339 |
| 5,714,000 A | 2/1998 | Wellen et al. | |
| 5,833,940 A | 11/1998 | Reiber et al. | |
| 5,858,911 A | 1/1999 | Wellen et al. | |
| 6,074,980 A | 6/2000 | Derleth et al. | |

(Continued)

FOREIGN PATENT DOCUMENTS

JP    2008063209    * 3/2008    ............. C01B 37/02

OTHER PUBLICATIONS

Schiller et al, "Synthesis of Mesoporous Silica Particles and Capsules by Miniemulsion Technique", Chem. Mater. 2009, 21, 5088-5098.*

(Continued)

*Primary Examiner* — Melvin C Mayes
*Assistant Examiner* — Smita Patel
(74) *Attorney, Agent, or Firm* — VLP Law Group, LLP (57) ABSTRACT

The present invention discloses glycoxy silanes as a source of silica and silica precipitated by advantageous chemical reactions preferably beginning with biogenic silica. Alkoxy $C-O-S_1$ are hydrolyzed in a controlled fashion to nucleate formation of nanoparticles of silica. The growth rate of the particles is controlled by various parameters such that particles of known sizes, size distributions, specific surface areas and pore sizes and size distributions are recovered.

11 Claims, 8 Drawing Sheets

(56) References Cited

U.S. PATENT DOCUMENTS

| | | |
|---|---|---|
| 6,114,280 A | 9/2000 | Stephens |
| 6,542,543 B2 | 4/2003 | Sugahara |
| 2006/0011512 A1* | 1/2006 | Espinoza et al. .......... 208/111.3 |
| 2011/0178227 A1 | 7/2011 | Allain et al. |

OTHER PUBLICATIONS

WO, International Search Report re Application No. PCT/US2013/021991, Apr. 25, 2013.

* cited by examiner

GLYCOXY SILANES AS A SOURCE OF SILICA AND SILICATE PRECIPITATES

This application claims the benefit of U.S. Provisional Application No. 61/587,188 filed Jan. 17, 2012 and U.S. Provisional Application No. 61/587,501 filed Jan. 17, 2012, which applications are incorporated herein by reference.

BACKGROUND

The open and the patent literature on sol-gel processing of silica containing materials is extensive. Most of the chemical compounds used as a precursors to silica containing materials are either tetramethoxy or tetraethoxy silanes (TMOS or TEOS). These precursor materials combined with either an acid or base catalyst and water to hydrolyze the precursor to form a variety of silica-containing materials. Polymeric silica contains residual alkoxy groups that can be used to form thin films or spinning fibers or used for processing mesoporous silicas or zeolitic materials with the addition of template molecules. Also, secondary alkoxides of other metals for example aluminum, titanium, hafnium and zirconium alkoxides may be added to make mixed-metal sol-gel derived "hybrid materials."

Alternately, organic monomers or polymers or organic functionalized silicon alkoxides such as R—Si(OEt)$_3$ or R$_2$Si(OEt)$_2$ may be used to introduce organic groups into the resulting mixed-metal sol-gel derived "hybrid materials." Organic/Inorganic Hybrid Materials, MRS Symp. Ser. Vol. 519, R. M. Laine, C. Sanchez, C. J. Brinker, E. Giannelis eds. December 1998; Organic/Inorganic Hybrid Materials 2000, MRS Symp. Ser. Vol. 628, R. M. Laine, C. Sanchez, and C. J. Brinker, eds. Mater. Res. Soc., 2001; *Organic/Inorganic Hybrid Materials* 2002, MRS Symp. Ser. Vol. 726, C. Sanchez, R. M. Laine, S. Yang and C. J. Brinker, eds. Mater. Res. Soc., December 2002; D. W. Schaeffer, Science 243 (1989) 1023-1027.

Precursors of silicon based materials are typically not water soluble and must be hydrolyzed in a solvent that allows them to become miscible in water so that efficient hydrolysis can be obtained. For example, TMOS and TEOS are typically hydrolyzed in water/MeOH or EtOH mixtures to create a single phase solution. Occasionally, researchers have made modified precursors by treating TMOS or TEOS with ligands that transform them into water-soluble materials. TMOS or TEOS are reacted with ethylene glycol or propylene glycol and a catalyst to form water soluble alkoxides that are hydrolyzed to produce silica-modified hybrid materials or mixed metal systems and/or mesoporous materials. See, for example N. Hüsing and U. Schubert, "Formation and Structure of Porous Gel Networks from Si(OMe)$_4$ in the Presence of A(CH$_2$)$_n$Si(OR)$_3$ (A) Functional Group) *Chem. Mater.* 1998, 10, 3024-3032; V. Torma, H. Peterlik, U. Bauer, W. Rupp, N. Hüsing, S. Bernstorff, M. Steinhart, G. Goerigk, U. Schubert, "Mixed Silica Titania Materials Prepared from a Single-Source Sol-Gel Precursor: A Time-Resolved SAXS Study of the Gelation, Aging, Supercritical Drying, and Calcination Processes," *Chem. Mater.* 2005, 17, 3146-3153; D. Brandhuber, V. Torma, C. Raab, H. Peterlik, A. Kulak, Nicola Hüsing, "Glycol-Modified Silanes in the Synthesis of Mesoscopically Organized Silica Monoliths with Hierarchical Porosity," *Chem. Mater.* 2005, 17, 4262-4271; S. Hartmann, D. Brandhuber, N. Hüsing, "Glycol-Modified Silanes Novel Possibilities for the Synthesis of Hierarchically Organized (Hybrid) Porous Materials," *Acc. Chem. Res.* 2007, 40, 885-894; M. Weinberger, "Organosilica Monoliths with Multiscale Porosity: Detailed Investigation of their formation and their potential as ceramic precursors," Dokter der Wissenschaft, Nov. 9 (2009); M. Weinberger, S. Puchegger, T. Fröschl, F. Babonneau, H. Peterlik, N. Hüsing, "Sol-Gel Processing of a Glycolated Cyclic Organosilane and Its Pyrolysis to Silicon Oxycarbide Monoliths with Multiscale Porosity and Large Surface Areas," Chem. Mater. 2010, 22, 1509-1520; T. Nakamura, H. Yamada, Y. Yamada, A. Gürtanyel, S. Hartmann, Nicola Hüsing, K. Yano, "New Strategy Using Glycol-Modified Silane to Synthesize Monodispersed Mesoporous Silica Spheres Applicable to Colloidal Photonic Crystals, Langmuir 2010, 26, 2002-2007; Y. Suzuki, M. Kakihana, "New Water Soluble and Handy Silicon Precursor for Synthesis of (Y,Ce,Gd)2SiO5 Phosphor," IOP Conference Series: Materials Sci. and Eng. 2009, 1 012012; K. Matsumara, M. Asai, S. Ichinohe, "Preparation of Water-Soluble Organic Silicon Compounds," U.S. Pat. No. 6,077, 966, Jun. 20, 2000; and H. Eck, M. Roth, "Aqueous redispersible powders which contain a water-soluble polymer and at least one organic silicon compound and process for preparing the same." U.S. Pat. No. 4,704,416 November 1987.

These examples use alkoxysilanes derived primarily by the direct reaction of alcohols with silicon metal as suggested in reaction (1) below wherein some form of catalyst is used to promote the reaction. Occasionally, the alkoxy silane Si(OR$_4$) is made by a more expensive route, reaction (2), that requires handling toxic and polluting SiCl$_4$. It is important to note that SiCl$_4$ is prepared from reaction of Si metal with HCl, as in reaction (3). Silicon metal is made by carbothermal reduction of SiO$_2$ and carbon as suggested by reaction, (4), however the exact process is more complex and the yields are not quantitative.

(1)

(2)

(3)

(4)

Furthermore, the cost of making Si(OR)$_4$ and the resulting commercial production of precipitated silica is usually prohibitive because of the carbothermal reduction step. An exception is the production of precipitated silica used for polishing silicon wafers for chip manufacture where purities equal to or greater than 99.999999 ("eight 9s") are needed and TMOS or TEOS can be distilled to these purities.

For these reasons, existing processes that use TEOS (or TMOS) or water soluble silica modified materials derived by substitution as shown in reaction (5) are usually mere academic exercises that are not suitable for large scale, efficient, commercial use.

(5)

To date, little commercial motivation exists to develop synthetic/processing routes to large quantities of precipitated silicas from these alkoxysilanes because of the multi-step, high temperature reaction costs of the starting materials. Consequently, the major route to precipitated silicas is the series of reactions (6)-(8):

(6)

(7)

(8)

Figure 1:
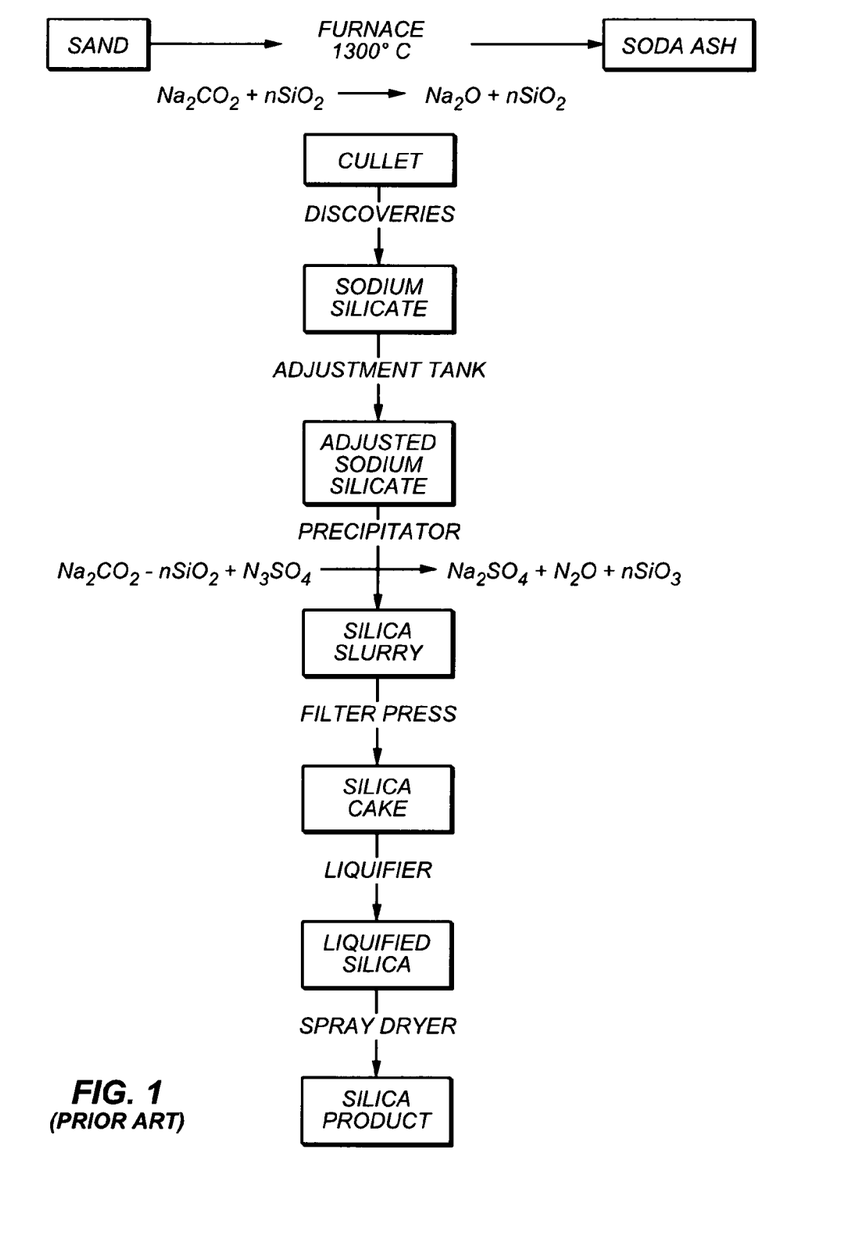
FIG. 1 is a flow chart of a prior art Precipitated silica production flowchart.

This typical industrial process scheme used to make 1000 ton/year quantities of precipitated silica is shown in FIG. 1. Note that considerable $CO_2$ is released into the atmosphere during this process. In addition, considerable amounts of $Na_2SO_4$ are produced as waste products that must be disposed of, thereby adding to the costs of the process.

Referring to FIG. 1, the first reaction step produces molten sodium silicate at high temperature that is thereafter acidified with an acid such as $H_2SO_4$. The result is an aqueous solution of sodium sulfate and some form of silicic acid, such as $Si(OH)_4$ or oligomers thereof.

This is a high temperature process requiring stoichiometric amounts of base and acid to effect precipitation. Precipitation occurs in an aqueous environment that produces large concentrations of byproduct salts such $Na_2SO_4$. The resulting silica powders such as HISIL 223 have salt contamination typically less than 2 wt %.

SUMMARY OF INVENTION

The current invention includes a process wherein a biogenic silica is dissolved using a catalytic amount of base rather than a stoichiometric amount in a solvent that is typically a 1,2 or 1,3 diol which coordinates with the silica to form alkoxysilanes of the type $Si(OR)_4$ where R is some group chosen from —$CH_2$—, —$CH_2O$—, —$CH(R')$—, —$CH(R')O$—, —$CH(OH)$— and where $R^1$ is alkyl, aryl, heteroalkyl, hetoraryl and alternate forms known to those skilled in the art. In the process of dissolution, the by-product water is distilled out to drive the dissolution reaction. This method of dissolution is that described in patent application Ser. No. 61/587,188 by the same inventors and is specifically incorporated by reference herein.

This method of dissolution uses catalytic amounts of base to dissolve silica and produces water soluble alkoxysilanes, typically glycoxy silanes. The dissolution reaction requires temperatures much less than 1400° C. and typically less than 300° C. Because the resulting product is water soluble, the use of a second solvent to hydrolyze the resulting alkoxysilane is normally unnecessary.

Additionally, to obtain precipitated silica, the amount of acid required, is only that necessary to neutralize the catalytic amount of base used in the dissolution reaction. However, precipitation can be effected simply by adding water without acid or by contacting the dissolved glyoxysilanes with a $CO_2$ rich atmosphere such as is produced in the burning of rice hulls. This is the reverse of reaction (9) (below) used to synthesize glycolato silicates. Thus, the cost of base and acid needed to produce precipitated silica is much less than traditional methods. A further advantage of using the reverse of reaction (9) is that following filtration of the precipitated silica, the recovered liquid is still quite basic and can be reused in the dissolution process of reaction (9) with fresh biogenic silica.

A further advantage is that the resulting alkoxysilanes are either simple liquids or oligomers whose viscosity can be controlled by the extent of oligomerization. Consequently, the viscosity of the mostly water-soluble intermediate can be adjusted to control the rate and degree of growth of silica particle during precipitation.

DETAILED DESCRIPTION OF INVENTION

It is well known that the rate of precipitation of silica can be controlled by pH, temperature and also solution viscosity, R. K. Iler, *The chemistry of silica*; John Wiley & Sons: New York, 1979, C. J. Brinker, G. Scherer *Sol-Gel science: The Physics and Chemistry of Sol-Gel Processing*, Academic Press, Boston, 1990, *Sol-Gel Science and Technology E*, J. A. Pope, S. Sakka, L. C. Klein, Eds.; Amer. Cer. Soc., Ohio, 1997) which in turn controls the physical properties of the resulting precipitated silica. Control of viscosity in silica precipitation is not a traditionally used to control particle properties.

The reactions below enable the creation of precipitated silicas from glycoxysilanes.

(9)

(10)

Thus, for example, the resulting mixture of glycoxysilane and silicon glycolate from reaction (9) can be treated with anhydrous acid to neutralize the base leaving pure Si(EGH)$_4$ as in reaction (10). Alternately, the as-formed reaction solution can be treated with excess water with or without added acid or $CO_2$ to perform the reverse of reaction (9) and precipitate silica as seen in reaction (11). It is also possible to remove the salt impurities by ion exchange before or after precipitation to make high purity silicon glycolates and/or precipitated silica. The degree of purity will be defined by the care in which the impurities are removed and/or the purity of the reactants and vessels in which reaction is effected.

(11)

The following examples illustrate several methods of precipitating silica.

Example 1

Typical Silica Precipitation Using Aqueous Acid Precipitation (Silicon Glycolate Obtained from KOH Catalyzed RHA Extraction)

Figure 2:
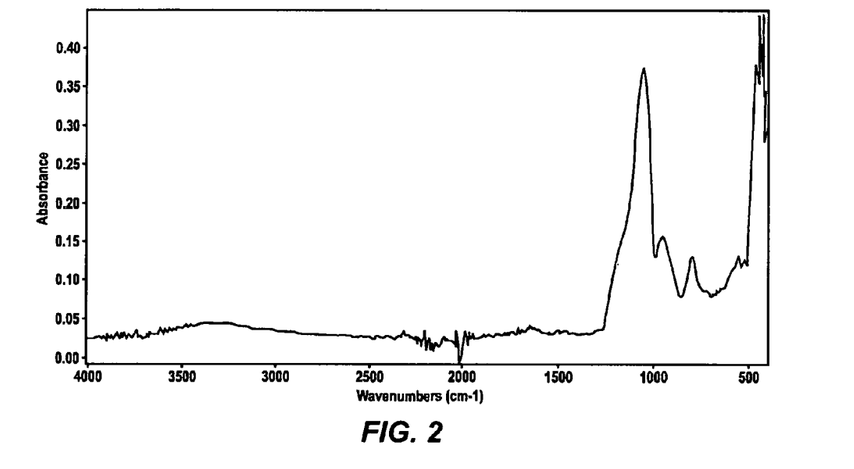
FIG. 2 is an FTIR spectrum of silica precipitated per the process described in Example 1.
Figure 3:
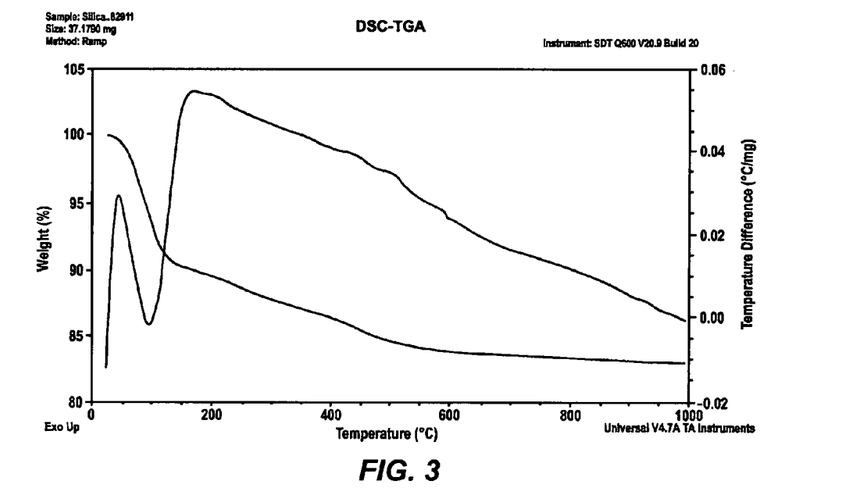
FIG. 3 is a TGA/DTA of silica precipitated in acid water from Example 1.

To a dry 12-L-reactor, equipped with a mechanical stirrer, was added 1600 g of silicon glycolate solution (≈20 wt % silica). Thereafter 2.6 L of aqueous acid pH<4 was added with vigorous stirring. After addition, the reaction mixture was stirred for an additional 30 min and the resulting precipitated silica filtered off. This recovered silica was stirred in methanol (15 h), then washed with a 10% HCl solution, filtered and washed with cold water. It was then dried at 65° C. for 3 days. The yields minus mechanical losses are ≈80% with typical specific surface areas (SSA=700 m$^2$/g). The FTIR and TGA analyses are shown in FIGS. 2 and 3.

Example 2

Silica Precipitation Using Hot Water Precipitation (Silicon Glycolate Solution Obtained from KOH Catalyzed RHA Extraction)

Figure 4:
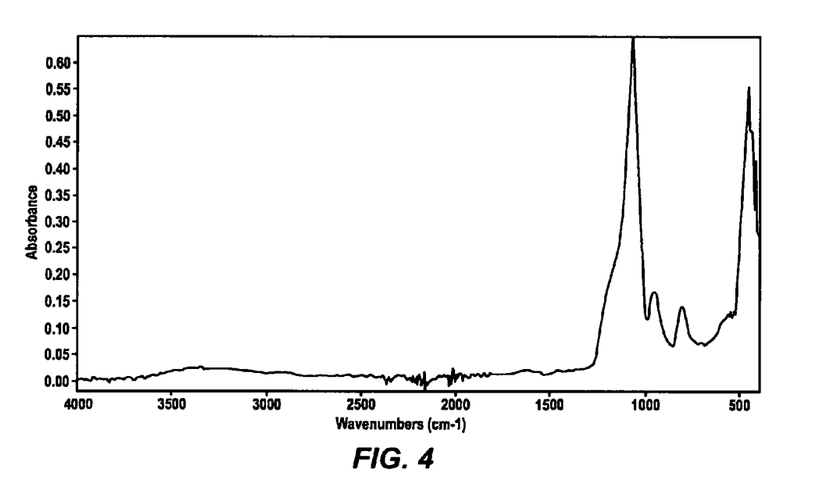
FIG. 4 is an FTIR spectrum of silica precipitated per the process described in Example 2.
Figure 5:
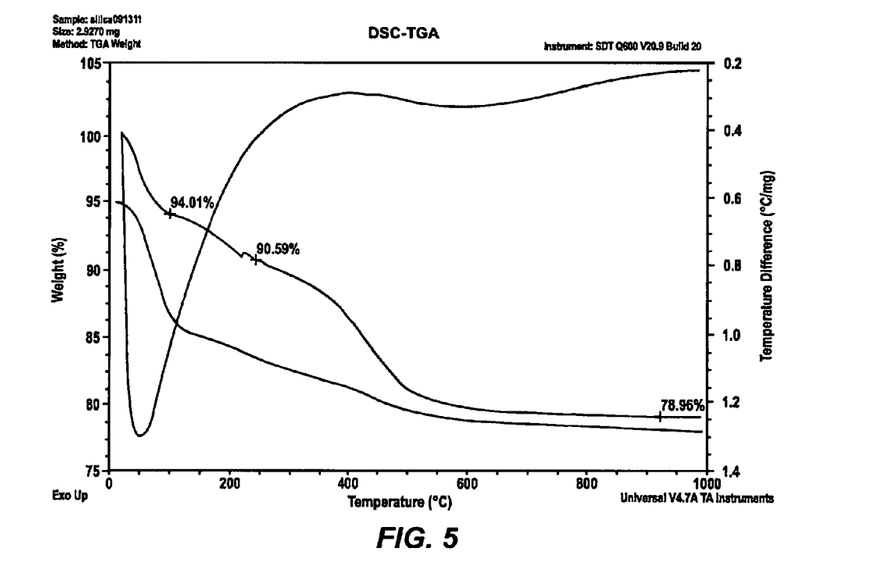
FIG. 5 is a TGA/DTA of silica precipitated in hot water from Example 2.

To a dry 12-L-reactor, equipped with a mechanical stirrer, was added 3265 g of concentrated silicon glycolate solution, CY (Clean Yield)≈21 wt %, with vigorous stirring to 4 L of water pre-heated to 80° C. The solution was stirred for 1 h, cooled down and filtered. The obtained silica was then stirred in 3 L of hot HCl (10%) for 2 h, filtered and washed with cold water giving an 85% yield of white powder after drying at 65° C. The SSA was found to be 225 m2/g. The FTIR and TGA analyses are shown in FIGS. 4 and 5. In this example, the particle surfaces are highly hydrated but this surface water can be removed by heating at 200° C. as suggested by the TGA data.

Example 3

Silica Precipitation Using Hot Water Precipitation (Reduced Water) (Silicon Glycolate Solution Obtained from KOH Catalyzed RHA Extraction)

Figure 6:
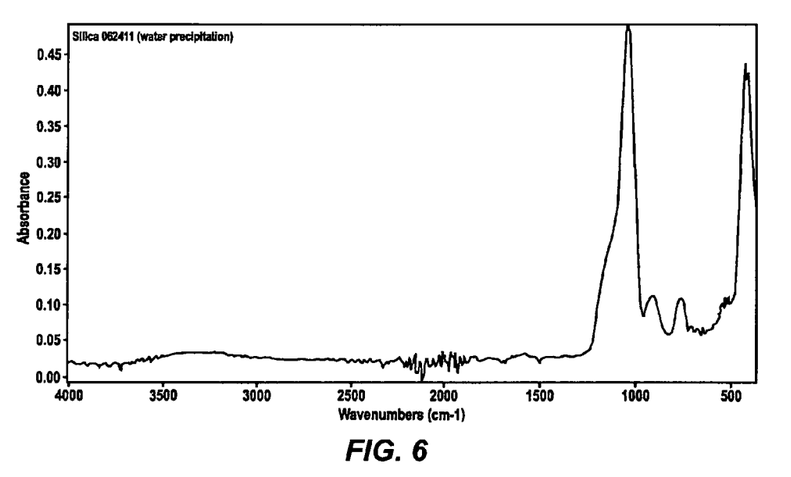
FIG. 6 is an FTIR spectrum of silica precipitated in hot water per the process described in Example 3.
Figure 7:
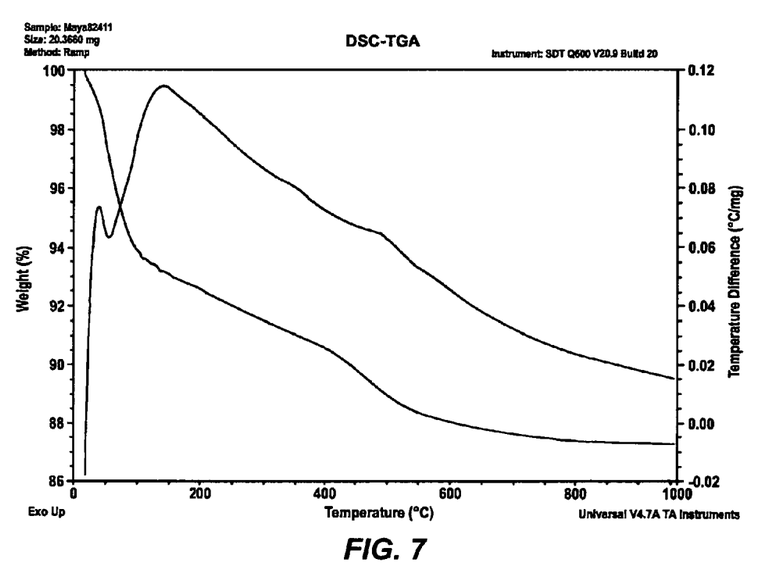
FIG. 7 is a TGA/DTA of silica precipitated in accordance with Example 3.

To a dry 12-L-reactor, equipped with a mechanical stirrer and a heating mantle, was added 1440 g of concentrated silicon glycolate solution, CY≈15 wt % with vigorous stirring to 2.5 L of water pre-heated to 80° C. The solution was stirred for 1 h, cooled down and filtered. The recovered filtrate can be recycled directly to dissolve biogenic silica per reaction (9). The obtained silica was then stirred in 2 L of hot HCl (10%) for 2 h and filtered and washed with cold water giving an 83% yield of white powder after drying at 65° C. overnight. The SSA was found to be 470 m$^2$/g. The FTIR and TGA analyses are shown in FIGS. 6 and 7. In this example, the particle surfaces are highly hydrated but this surface water can be removed by heating at 200° C. as suggested by the TGA data.

Example 4

Silica Precipitation with Hot Aqueous Acid (Silicon Glycolate Solution Obtained from NaOH Catalyzed RHA Extraction)

Figure 8:
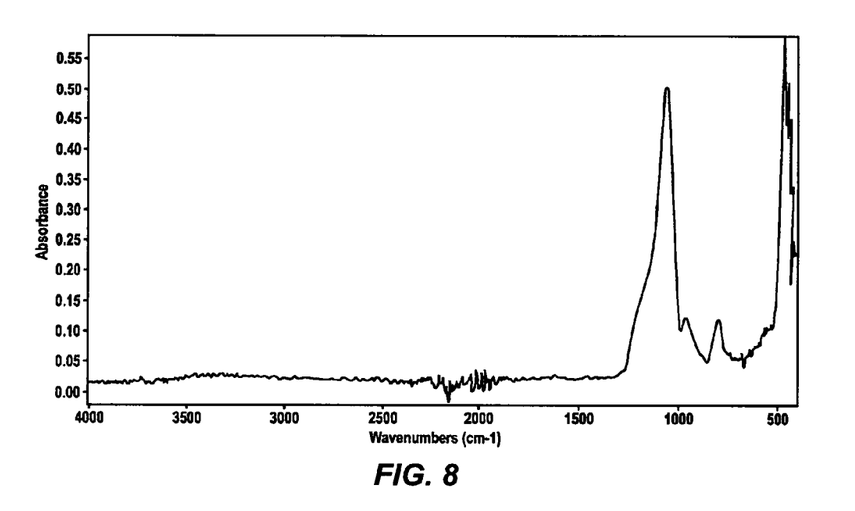
FIG. 8 is an FTIR spectrum at silica precipitated per the process described in Example 4.
Figure 9:
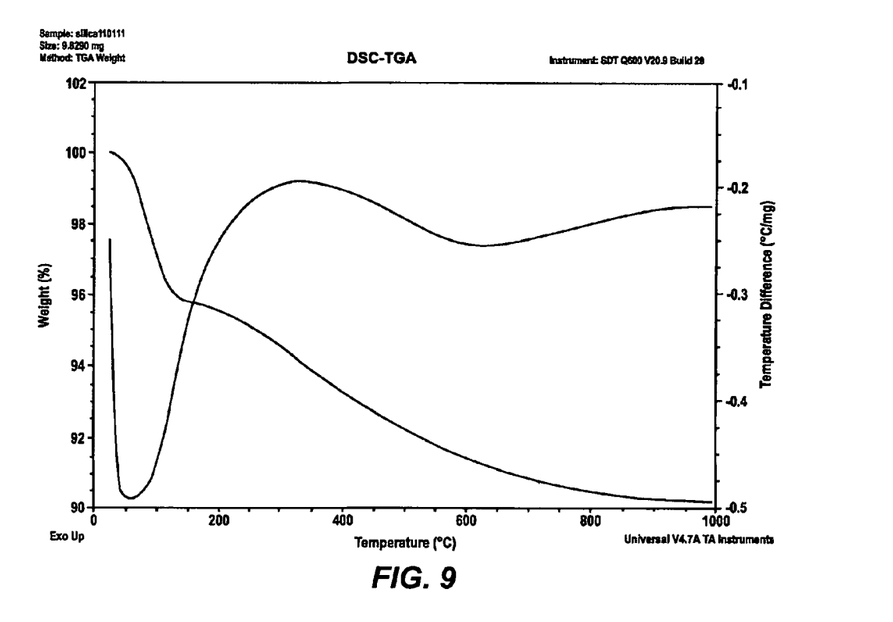
FIG. 9 is a TGA/DTA of silica precipitated in accordance with Example 4.

Water (700 ml) was added to a beaker and subjected to rapid stirring. This water was heated to 70° C. and then 236 g of silicon glycolate solution (CY=15 wt %) was added. The water/silicon glycolate mixture was heated to 80° with continuous agitation C for 1-2 h. Hydrochloric acid (10% solution) was added until the pH was adjusted to 5 and then the temperature was raised to 85°-90° C. The mixture was stirred for another 75 min and then filtered. The isolated silica was washed with cold water until the pH was 7. The precipitated silica was then washed with methanol, filtered and dried at 60° C. for 24 h resulting in an 86 wt % yield of a white powder with SSAs of 180-250 m$^2$/g. The FTIR and TGA analyses are shown in FIGS. 8 and 9.

Example 5

Silica Precipitation Using Acid Addition (Silicon Glycolate Solution Obtained from NaOH Catalyzed RHA Extraction)

Distilled water (4.5 L) was introduced to a 12-L-reactor, equipped with a mechanical stirrer and heating mantle, and pre-heated to 80°. Then, silicon glycolate solution (3570 g, CY~8 wt %) was added with vigorous stirring. Sufficient sulfuric acid (10%) was added to bring the pH to 5. The mixture was then left stirring vigorously at 80° C. 1 h.

Figure 10:
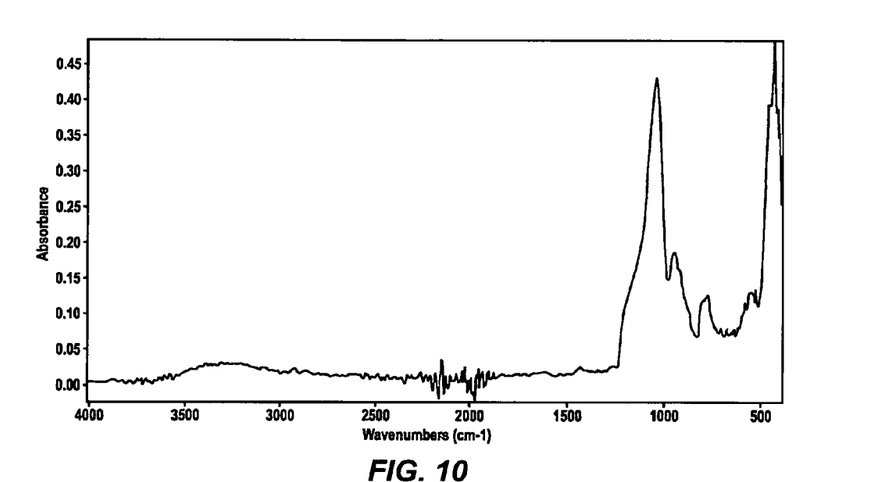
FIG. 10 is an FTIR spectrum of precipitated silica made by $H_2SO_4$ addition.
Figure 11:
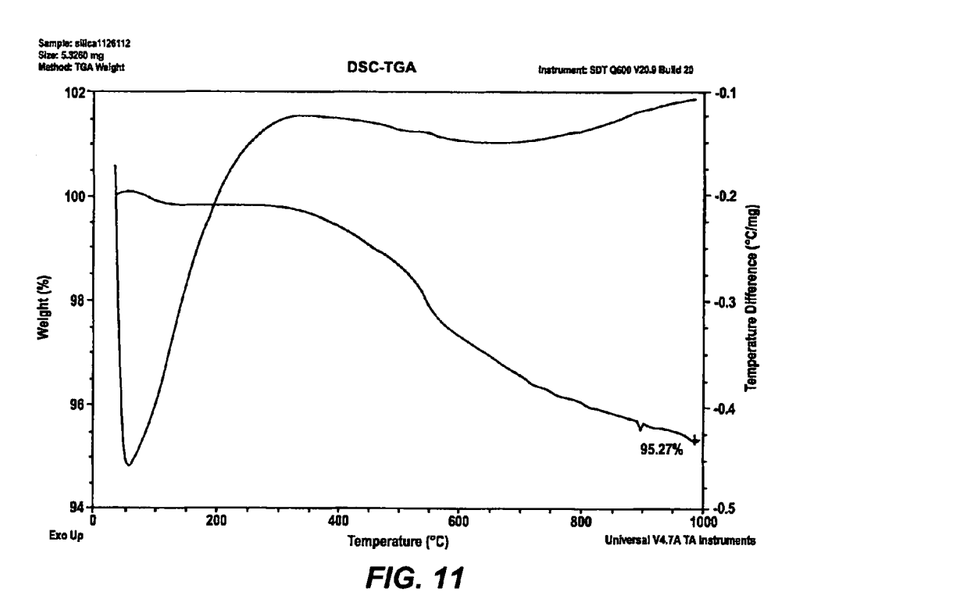
FIG. 11 is an FTIR of silica precipitated by acetic acid addition.

In an "aging" step, a basic agent (ammonium hydroxide) was added until the pH was adjusted to 8. Vigorous stirring was continued for 1 h more. Finally the mixture was cooled and filtered. The obtained white silica was then washed in hot methanol and then filtered. The white silica powder was oven dried at 70° C. for 2-5 days and then milled with zirconia media for 3 h. The FTIR and TGA analyses are shown in FIGS. 10 and 11.

Example 6

Silica Precipitation Using Acetic Acid Addition Followed by Aging

Figure 12:
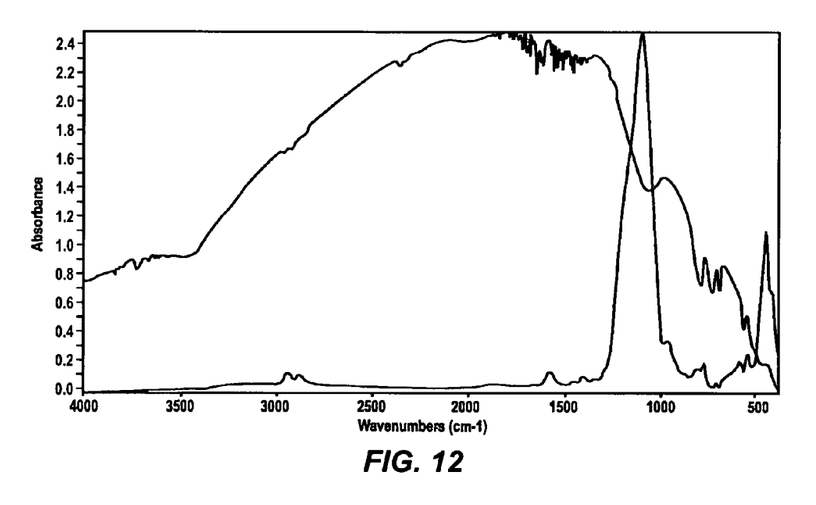
FIG. 12 is a TGA/DTA of silica precipitated by reverse acid addition when the acid is acetic acid.

Silicon glycolate (60 g, CY=15 wt. %) was added drop-wise to 160 mL of water pre-heated to 80° C. Acetic acid was added to decrease the pH to 5 and the suspension was left to stir for 1 h at 80° C. Ammonium hydroxide was then added to increase the pH to 8 and the suspension was left to stir for 1 h. Finally the suspension was cooled and filtered. The obtained white silica was then washed in hot methanol and then filtered. The silica powder was oven dried at 70° C. overnight and then dried at 250° C. for 35 min. The silica was obtained in 90% yield (8.1 g obtained, theoretical yield 9 g). The FTIR and TGA analyses are shown in FIGS. 11 and 12.

The precipitated silica may also be obtained as a zeolite. Zeolites are crystalline solids structures made of silicon, aluminum and oxygen that form a framework with cavities and internal channels where cations, water and/or small molecules may reside. Zeolites exhibit an open 3D framework made of SiO$_4$ and AlO$_4$ tetrahedra linked to each other by sharing all the oxygen atoms to form regular intra-crystalline cavities and channels of molecular dimensions. A defining feature of zeolites is that their frameworks are made up of 4-coordinated atoms forming tetrahedra. The framework structure may contain linked cages, cavities or channels, which are big enough to allow small molecules to enter. The system of large voids explains the consistent low specific density of these compounds. In zeolites used for various applications, the voids are interconnected and form long wide channels of various sizes depending on the compound. These channels allow the easy drift of the resident ions and molecules into and out of the structure. The aluminosilicate framework is negatively charged and attracts the positive cations that reside in cages to compensate for the negative charge of the framework.

Example 7

Silica Precipitation Using Acetic, Acid Addition (Silicon Glycolate Solution Obtained from NaOH Catalyzed RHA Extraction)

Figure 13:
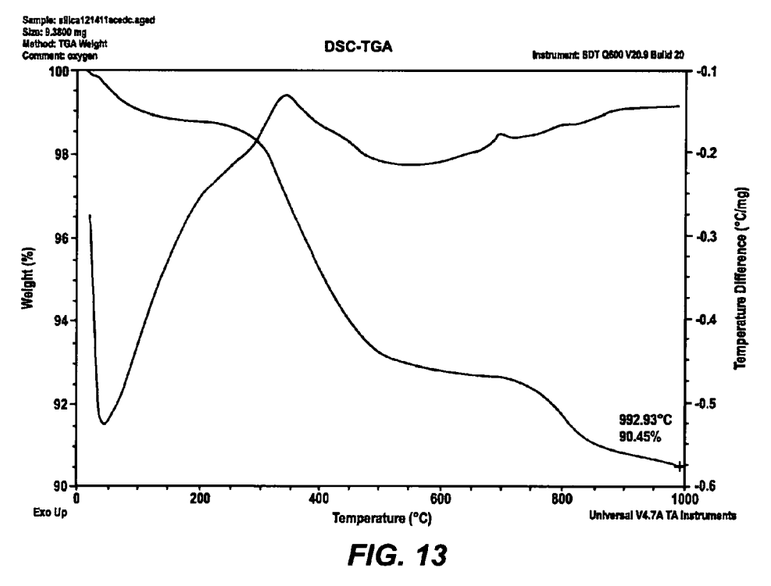
FIG. 13 is an FTIR of silica precipitated by acetic acid addition.
Figure 14:
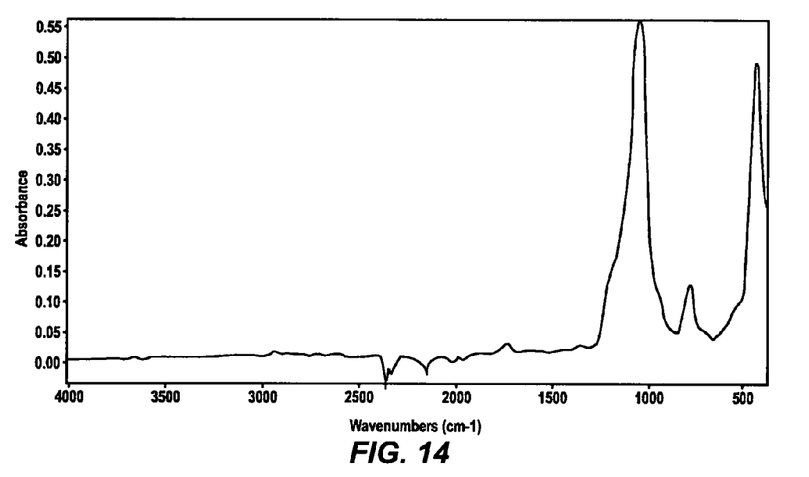
FIG. 14 is a TGA/DTA of silica precipitated by reverse acid addition where the acid is acetic acid.
Figure 15:
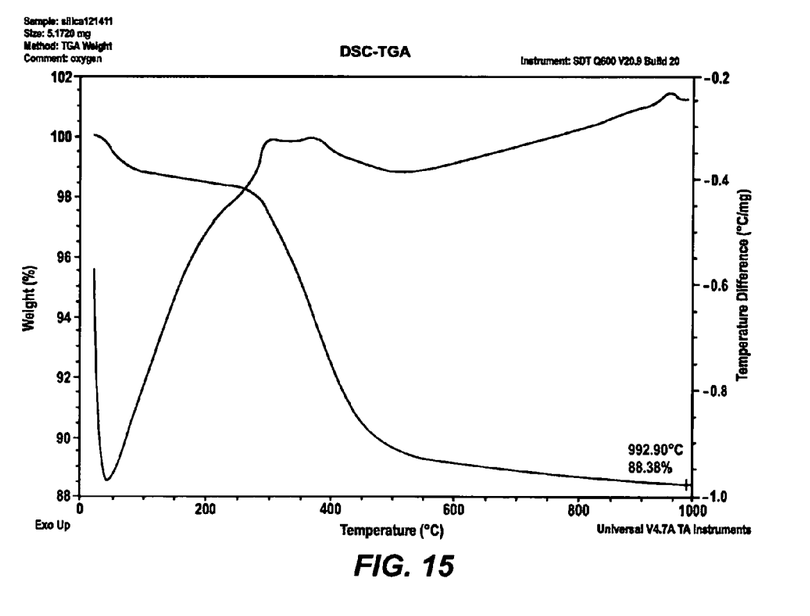
FIG. 15 is a TGA/DTA of silica made by reverse acid addition where the acid is acetic acid.

Distilled water (150 mL) was introduced to a 1-L-reactor, equipped with a magnetic stirrer and a heating mantle, and pre-heated to 80°. Then, silicon glycolate solution (55 g, CY~17 wt %) was added with vigorous stirring. Then, 15 mL of acetic acid (10%) was added drop-wise. The mixture was left stirring vigorously at 80° C. for 30 min. The mixture was cooled down and filtered. The obtained white silica was then washed in hot methanol and filtered. The silica powder was oven dried at 70° C. overnight, and at 250° C. for 30 min. The FTIR and TGA analyses are shown in FIGS. 13 and 14.

The following references disclose general principles of sol-gel processing of silica containing materials and are specifically incorporated by reference.

1. R. K. Iler, *The chemistry of silica*; John Wiley & Sons: New York, 1979.
2. C. J. Brinker, G. Scherer *Sol-Gel science: The Physics and Chemistry of Sol-Gel Processing*, Academic Press, Boston, 1990.
3. *Sol-Gel Science and Technology*; E. J. A. Pope, S. Sakka, L. C. Klein, Eds.; Amer. Cer. Soc., Ohio, 1997.
4. Organic/Inorganic Hybrid Materials, MRS Symp. Ser. Vol. 519, R. M. Laine, C. Sanchez, C. J. Brinker, E. Giannelis eds. December 1998
5. Organic/Inorganic Hybrid Materials 2000, MRS Symp. Ser. Vol. 628, R. M. Lathe, C. Sanchez, and C. J. Brinker, eds. Mater. Res. Soc., 2001

6. *Organic/Inorganic Hybrid Materials* 2002, MRS Symp. Ser. Vol. 726, C. Sanchez, R. M. Laine, S. Yang and C. J. Brinker, eds. Mater. Res. Soc., December 2002.

D. W. Schaeffer, *Science* 243 (1989) 1023-1027.

We claim:

1. A method to precipitate silica comprising:
   (1) neutralizing a base in a solution comprising a silicon alkoxide containing 10-40 wt % dissolved silica, wherein alkoxy groups are selected from the group consisting of 1,2; 1,3; 1,4 diols; and triols; and polyols and mixtures thereof, by adding an amount of water to hydrolyze alkoxy C—O—Si bonds;
   (2) recovering precipitated silica by filtration; and
   (3) recycling recovered filtrate into a dissolution process, wherein silica is dissolved in a base to produce water soluble alkoxysilanes.

2. The method of claim 1 further comprising the step of controlling the pH of the solution by adding a second base to control a parameter selected from the group consisting of surface area, pore size, size distribution, and pore volume and combinations thereof.

3. The method of claim 2 wherein the second base is ammonium hydroxide or an alkyl ammonium salt and the precipitated silica is a crystalline solid structure.

4. The method of claim 1 wherein the 1, 2 diol is ethylene glycol, and the 1, 3 diol is propylene glycol or glycerol.

5. The method of claim 1 wherein the silicon alkoxide contains approximately 20-35 wt % dissolved silica.

6. The method of claim 1 wherein the recovering step is performed at temperatures of −20 to 180° C.

7. The method of claim 1 further comprising the steps of stirring in acid solution, washing with water and drying the precipitated silica to produce silica with specific surface areas in excess of 400 $m^2/g$ and pore volumes of 0.5 to 1.5 cc/g.

8. The method of claim 1 further comprising the step of washing and drying the precipitated silica to produce specific surface areas between 50 and 250 $m^2/g$ and pore volumes of 0.5 to 1.5 cc/g.

9. The method of claim 1 wherein the precipitated silica is acid washed and dried to produce silica with purities ranging from 99% to 99.9999%.

10. The method of claim 1 wherein the precipitated silica is dried to produce silica with water contents of 0.1-10 wt %.

11. The method of claim 1 further comprising the step of recycling a filtrate to recover the diols, triols or polyols.

* * * * *